United States Patent [19]

Free

[11] Patent Number: 5,503,800
[45] Date of Patent: Apr. 2, 1996

[54] ULTRA-VIOLET STERILIZING SYSTEM FOR WASTE WATER

[75] Inventor: David Free, Vancouver, Canada

[73] Assignee: UV Systems Technology, Inc., British, Canada

[21] Appl. No.: 209,442

[22] Filed: Mar. 10, 1994

[51] Int. Cl.⁶ .................................. A61L 2/10; C02F 1/32
[52] U.S. Cl. .......................... 422/24; 422/905; 250/432 R; 250/436; 250/438
[58] Field of Search ........................... 422/22–24, 186.3, 422/905; 250/432 R, 455.11, 436, 437, 438; 366/306, 307

[56] References Cited

U.S. PATENT DOCUMENTS

| | | | |
|---|---|---|---|
| 1,896,379 | 2/1933 | Ross | 250/432 R |
| 2,338,387 | 1/1944 | Whitman | 250/436 |
| 3,711,709 | 1/1973 | Rudolf | 422/22 X |
| 3,731,090 | 5/1973 | Veloz | 422/24 X |
| 3,837,800 | 9/1974 | Wood | 422/24 |
| 4,184,076 | 1/1980 | Kosnoff | 250/437 |
| 4,336,223 | 6/1982 | Hillman | 422/24 |
| 5,019,256 | 5/1991 | Ifill et al. | 422/24 X |
| 5,068,030 | 11/1991 | Chen | 422/24 X |
| 5,124,131 | 6/1992 | Wekhof | 422/24 X |
| 5,200,156 | 4/1993 | Wedekamp | 422/24 X |
| 5,208,461 | 5/1993 | Tipton | 250/436 |
| 5,230,792 | 7/1993 | Sauska et al. | 422/24 X |

Primary Examiner—Robert J. Warden
Assistant Examiner—E. Leigh Dawson
Attorney, Agent, or Firm—Poms, Smith, Lande & Rose

[57] ABSTRACT

An apparatus for exposing a liquid to bactericidal radiation is disclosed. The apparatus includes a source of ultra-violet radiation and a non-opaque housing enclosing the source of ultra-violet radiation to prevent exposure of the source to the liquid and permit exposure of the liquid to the radiation. Channels conforming to the shape of the housing are provided. Projections are formed in the channels to induce turbulent plug flow such that when the apparatus is inserted into a flow of liquid to be treated, the channels act to confine and direct liquid about the housing and the projections act to establish a continuous, cyclical flow in the channels between the housing and the channel walls to ensure exposure of the liquid to a lethal dose of the ultra-violet radiation of the source. Methods utilizing the apparatus for exposing a liquid to bactericidal radiation are also disclosed.

13 Claims, 3 Drawing Sheets 5,503,800

ULTRA-VIOLET STERILIZING SYSTEM FOR WASTE WATER

FIELD OF THE INVENTION

This invention relates to a system for treatment of waste water with ultra-violet radiation to reduce microbiological contamination.

BACKGROUND OF THE INVENTION

Modern potable water supply systems and waste water handling systems have long relied on various methods to remove microbiological contamination. In treatment of water, it is generally contamination by fecal coliforms, particularly *E. coli* bacteria, that is monitored and treated as the presence of these organisms indicates fecal contamination that can lead to rapid spread of disease through the water supply or receiving water body. It is still not uncommon to discharge waste water streams without any treatment at all, raising the question of increased ecological damage and fouling of water bodies and potable water supplies. Generally, in the past, the preferred method of eliminating or reducing microorganism contamination in potable water supplies and in waste water handling systems where practised has been through the use of chlorination. Chlorination suffers from disadvantages in that it is expensive to administer, the dosage of chlorine must be carefully controlled to ensure proper and effective treatment of the water, and it is not particularly effective with water that contains a large amount of suspended particulate solids. In treating waste water streams, there is the potential of introducing harmful and carcinogenic organo-chlorides.

Other methods have been developed to treat microbiological contamination of water that do not involve the addition of a treatment agent. The most popular amongst these techniques is exposing water to ultra-violet radiation to kill any foreign organisms. A number of systems have been developed to deliver ultra-violet radiation to a liquid.

When designing a system to deliver ultra-violet radiation to water, there are a number of factors to take into account. First, ultra-violet radiation, particularly when of low intensity, does not penetrate very deeply into water and therefore, it is necessary to expose a relatively thin film of water to the radiation to ensure that a lethal dose of radiation is delivered. Second, the effectiveness of ultra-violet radiation is reduced when treating murky water such as sewage effluent. Suspended, particulate solids that increase the turbidity of the water cannot be penetrated by the ultra-violet radiation.

The result of the foregoing design considerations is that previous ultra-violet water treatment systems have often been small scale systems that have a limited throughput. Examples of prior small scale systems for treating aquarium water or water as it emerges directly from the household tap are exemplified in U.S. Pat. No. 2,338,387 to Whitman, U.S. Pat. No. 3,731,090 to Veloz, and U.S. Pat. No. 4,184,076 to Kosnoff.

U.S. Pat. No. 4,336,223 to Hillman, U.S. Pat. No. 3,711,709 to Rudolf and U.S. Pat. No. 3,837,800 to Wood disclose larger scale systems for treating water with ultra-violet radiation. Wood is a good example of the design considerations that limit current ultra-violet sterilization systems. Wood discloses a system that is limited to thin sheet flow of water to be treated past an ultra-violet source to ensure adequate penetration of the ultra-violet radiation. To increase the dosage of radiation to a level that will kill microorganisms, Wood has to use a long residence time. The use of laminar sheet flow of water with a long residence time leads to a very limited capacity for Wood's system.

SUMMARY OF THE INVENTION

The present invention provides an ultra-violet treatment system for water that addresses the low throughput problems of the prior art caused by the limited penetration of ultra-violet radiation through murky water.

The system of the present invention relies on a system of channels about a radiation source that create turbulent plug flow past the radiation source to greatly increase the throughput of the system. To do this, turbulent flow is established to create a cyclical flow of water past the radiation source so that water is continually transported from directly adjacent the radiation source to a position distant from the radiation source and back again to permit equal exposure of all water to a lethal radiation dose.

Accordingly, the present invention provides an apparatus for exposing a liquid to bactericidal radiation comprising:

a source of ultra-violet radiation;

non-opaque housing means enclosing the source of ultra-violet radiation to prevent direct exposure of the source to the liquid and permit exposure of the liquid to the radiation;

channel means positioned to form uniform channels conforming about the housing means; and means for inducing turbulent flow in the channels such that when the apparatus is inserted into a flow of liquid to be treated, the channels act to confine and direct liquid about the housing means and the means for inducing turbulent flow act to establish a cyclical flow in the channels between the housing means and the channel means to ensure balanced exposure of the liquid to a lethal dose of the ultra-violet radiation of the source.

In a further aspect, the present invention provides a method for exposing a liquid to bactericidal radiation comprising the steps of:

providing a source of ultra-violet radiation;

moving liquid to be treated past the source of ultra-violet radiation in paths conforming about the source; and inducing a turbulent cyclical flow of the liquid in the paths about the radiation source to ensure balanced exposure of the liquid to the ultra-violet radiation of the source.

The apparatus and method of the present invention provide a system for sterilizing water using ultra-violet radiation that offers improved efficiency, capacity and performance over the prior art.

BRIEF DESCRIPTION OF THE DRAWINGS

Aspects of the present invention are illustrated, merely by way of example, in the accompanying drawings, in which.

DESCRIPTION OF THE PREFERRED EMBODIMENTS

Figure 2:
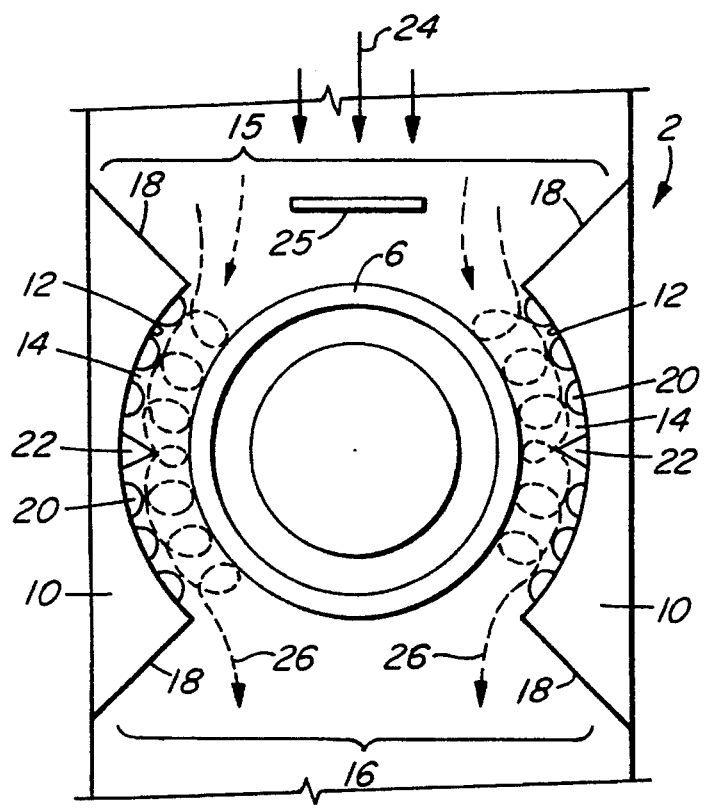
FIG. 2 is a plan view of the ultra-violet radiation source and associated flow passage of the present invention slowing the flow path of liquid through the passage.
Figure 5:
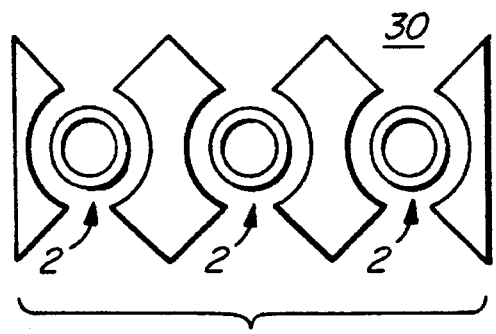
FIG. 5 is a plan view of a plurality of the units shown in FIG. 2 arranged in parallel.
Figure 6:
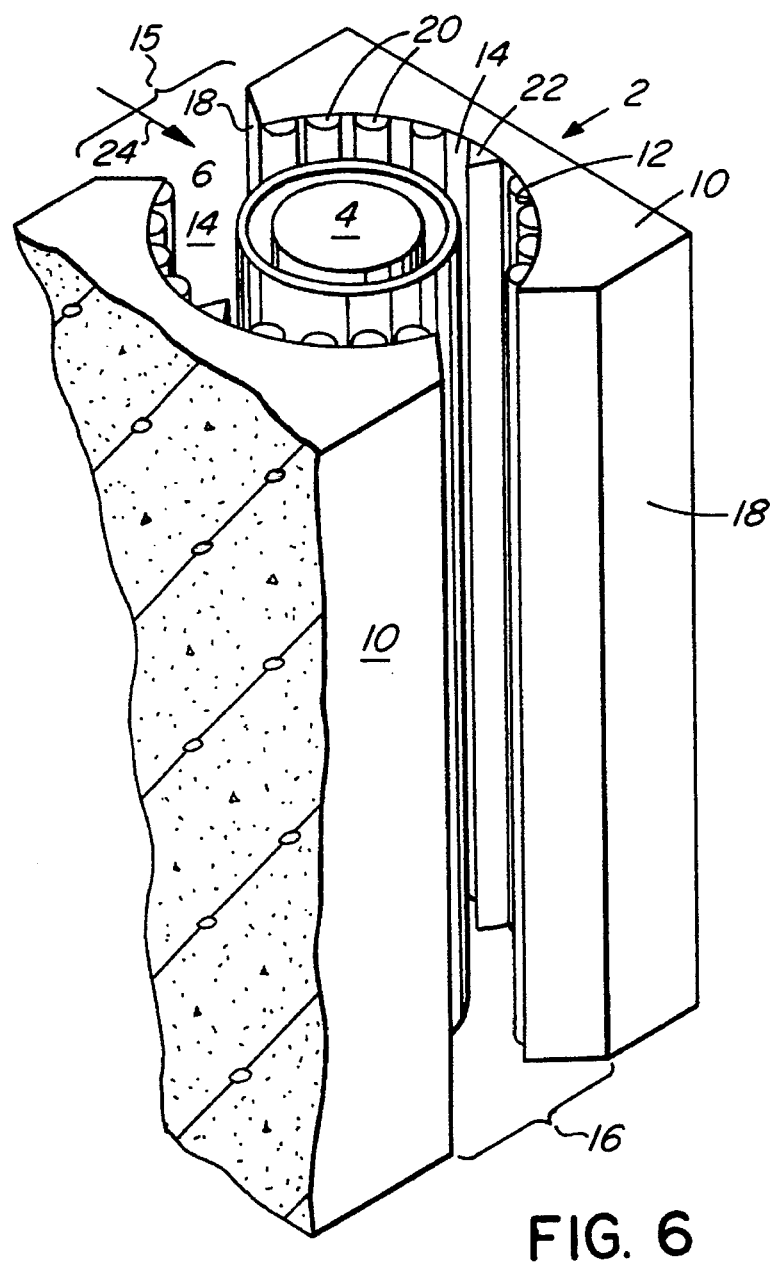
FIG. 6 is a perspective view of the apparatus of FIG. 1.

Referring to FIGS. 2 and 5, there is shown apparatus 2 for exposing a liquid water to ultra-violet radiation according to a preferred embodiment of the present invention. The apparatus comprises a source of ultra-violet radiation in the form of an elongated, high intensity fluorescent tube 4. When tube 4 is plugged into a electric source it generates the desired ultra-violet radiation. Tube 4 is a high intensity source of ultra-violet radiation generating wavelengths in the range of 254 nm. Tube 4 is enclosed within a non-opaque housing 6 that prevents direct exposure of the radiation source to any liquid passing through the apparatus while permitting exposure of the liquid to the radiation. Housing 6 is a transparent quartz sheath that transmits virtually all the ultra-violet radiation generated by tube 4.

Housing 6 is partially surrounded on either side by channel means positioned to form uniform width channels of semi-circular configuration that conform about housing 6. The channel means comprises a pair of spaced, elongate wall members positioned adjacent and parallel housing 6 on opposite sides thereof. Each elongate wall member 10 is formed with a concave inner wall 12 to define a uniform, semi-annular channel 14 between the housing 6 and the wall 12 for liquid flow on either side of the housing 6. The entrance 15 and the exit 16 to channels 14 are preferably formed with inwardly angled walls 18 that co-operate to guide liquid flow through channels 14.

Figure 3:
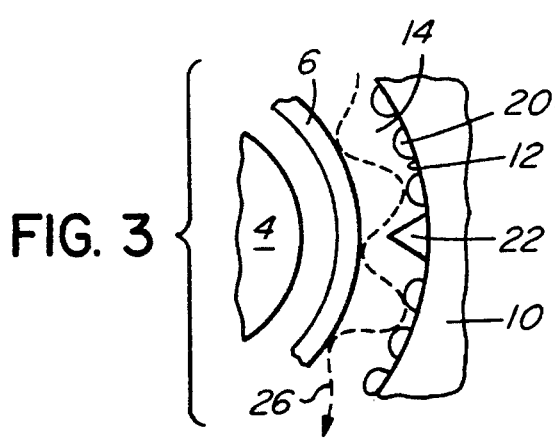
FIG. 3 is a partial plan view showing an alternative flow path through the passages.

Within channels 14 are provided means for inducing turbulent flow in the channels. The flow through the channels is plug flow in which all fluid elements move at essentially the same rate. The means for inducing turbulent flow comprises a plurality of projections 20 and 22 that extend into the channels from the concave inner walls 12. Semi-circular projections 20 and triangular projection 22 are designed to induce turbulent, cyclical flow in the liquid flowing through channels 14. Semi-circular projections 20 act to break up the boundary layer of liquid adjacent inner walls 12 and move the liquid toward the radiation source. Triangular projections are positioned to direct flow at the radiation source and project ⅓ of the distance from wall to radiation source. As best shown in FIG. 2, liquid to be treated enters the apparatus through entrance 15, as indicated by arrow 24, and splits to enter one of the channels 14. A barrier 25 can be inserted in entrance 15 to assist in splitting of the liquid flow and establishing turbulent flow. Once within channels 14, the liquid is caused to move in a cyclical pattern. For example, as indicated by dashed arrow 26, liquid flow will tend to move in a helical pattern, or as shown in FIG. 3, flow can also be established in a sinuous pattern. In practice, flow will be a combination of these general cycle patterns. This cyclic flow of the liquid from channel wall-to-radiation source-to-channel wall ensures that the liquid is exposed to the average of the maximum radiation intensity at the quartz sheath and the minimum radiation intensity at the channel wall. Therefore, all elements of the liquid are equally exposed and tend to receive a lethal radiation dose to kill micro-organisms. This allows for optimum use of the ultra-violet radiation and optimum treatment efficiency.

The cyclical flow arrangement of the present invention also permits the apparatus to handle a greater liquid throughput and a liquid having a greater turbidity or murkiness than in the past. Intensity of ultra-violet light falls off exponentially with distance from the source and is further compounded by an exponential fall off with reduced transmission through the liquid. With a typical ultra-violet transmission of 20% in sewage effluent, the ultra-violet intensity 0.25 inches from the source would be reduced to about 35% of the source intensity, at which point the bactericidal effect of the radiation is significantly reduced. Therefore, prior art systems have relied on very, thin laminar flow and long residence time past an ultra-violet radiation source to ensure that the liquid received a lethal dose of radiation.

In contrast, the system of the present invention with its turbulent, cyclical flow can treat a greater depth of liquid. In a prototype test, a channel width of 1.25 inches was used. In this arrangement, the ultra-violet intensity at the channel wall for a liquid such as sewage having an ultra-violet transmission of 20% is essentially negligible at 0.6% of the source intensity. The apparatus of the present invention, however, continuously cycles the fluid from the channel wall (at 0.6% intensity) to the quartz sheath (at nearly 100% intensity) thus giving the liquid an average intensity exposure of nearly 50%. The sterilizing effect of such an exposure is demonstrated by a bacterial kill of 3 to 5 log cycle reductions in prototype testing using the extreme case of an actual mix of raw sewage as the liquid to be treated. The results of the prototype testing are set out below.

As well as providing a greater average exposure intensity leading to significant bacterial kill, the wider channels of the present invention permit a greater liquid throughput.

Figure 1:
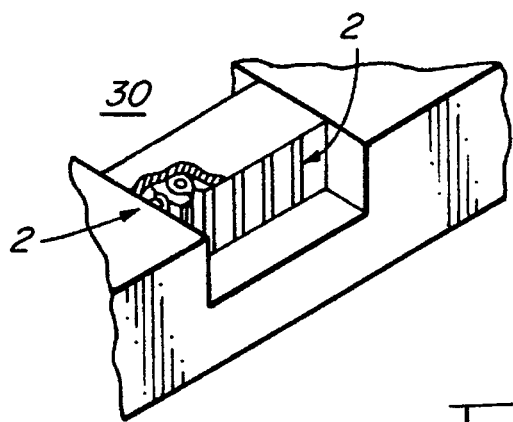
FIG. 1 is a perspective view of the system of the present invention in place in a waste water flow channel.
Figure 4:
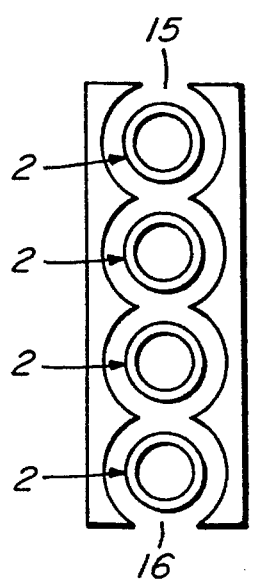
FIG. 4 is a plan view of a plurality of the units shown in FIG. 2 arranged in series.

The apparatus of FIGS. 2 and 5 represents a basic unit for incorporation into an array of units as illustrated in FIGS. 1, 3 and 5 to treat larger volumes of liquid. The unit 2 of FIG. 2 can be arranged in an array of interconnected units that define a plurality of parallel channels to extend across a passage 30 for liquid flow as illustrate in FIG. 4. Alternatively, the units 2 can be arranged as in FIG. 3 in an array of interconnected units to give multiplied efficiency that define a plurality of channels organized in series in which the exit 16 of one unit is the entrance 15 of the next. The most useful arrangement is illustrated in FIG. 1. This array is a combination of the arrays of FIGS. 3 and 4 in which the units 2 are positioned in multiple rows of parallel channels across a passage for liquid flow 30. The units are dimensioned to be the same height as the passage 30 to handle any level of liquid flow. Passage 30 can be an open waste water channel from a sewage treatment plant or the like, or a sealed channel.

The improved efficiency, capacity and performance of the apparatus and method of the present invention are apparent in the following summary of data collected during stringent prototype testing of the present invention. The testing was carried out using a single ultra-violet source and a channel width of 2 inches between the quartz sheath and the channel wall-a-width designed to stretch the limits of the invention. Various flow rates of sewage effluent having an average transmittance of ultra-violet radiation of 50% were run through the prototype. *E. coli* counts were made before and after treatment. For comparison purposes, the same tests were run on a ultra violet unit having a radiation source positioned between parallel, planar side walls positioned 2 inches on either side of the radiation source.

| Summary of Data collected using Unit according to the present invention | | | |
|---|---|---|---|
| | Mean No. *E. coli*/100 ml | | |
| Flow (US gal/min) | Influent | Effluent | Mean Log Cycle Reduction |
| 250 | 53,000 | 33 | 4.06 |
| 300 | 60,000 | 283 | 2.47 |
| 400 | 83,000 | 1200 | 1.91 |
| Summary of Data collected using Unit having planar side walls | | | |
| 100 | 46,700 | 0 | 4.67 |
| 200 | 56,700 | 367 | 2.52 |
| 300 | 36,700 | 700 | 1.71 |
| 400 | 33,300 | 1567 | 1.33 |

Figure 7:
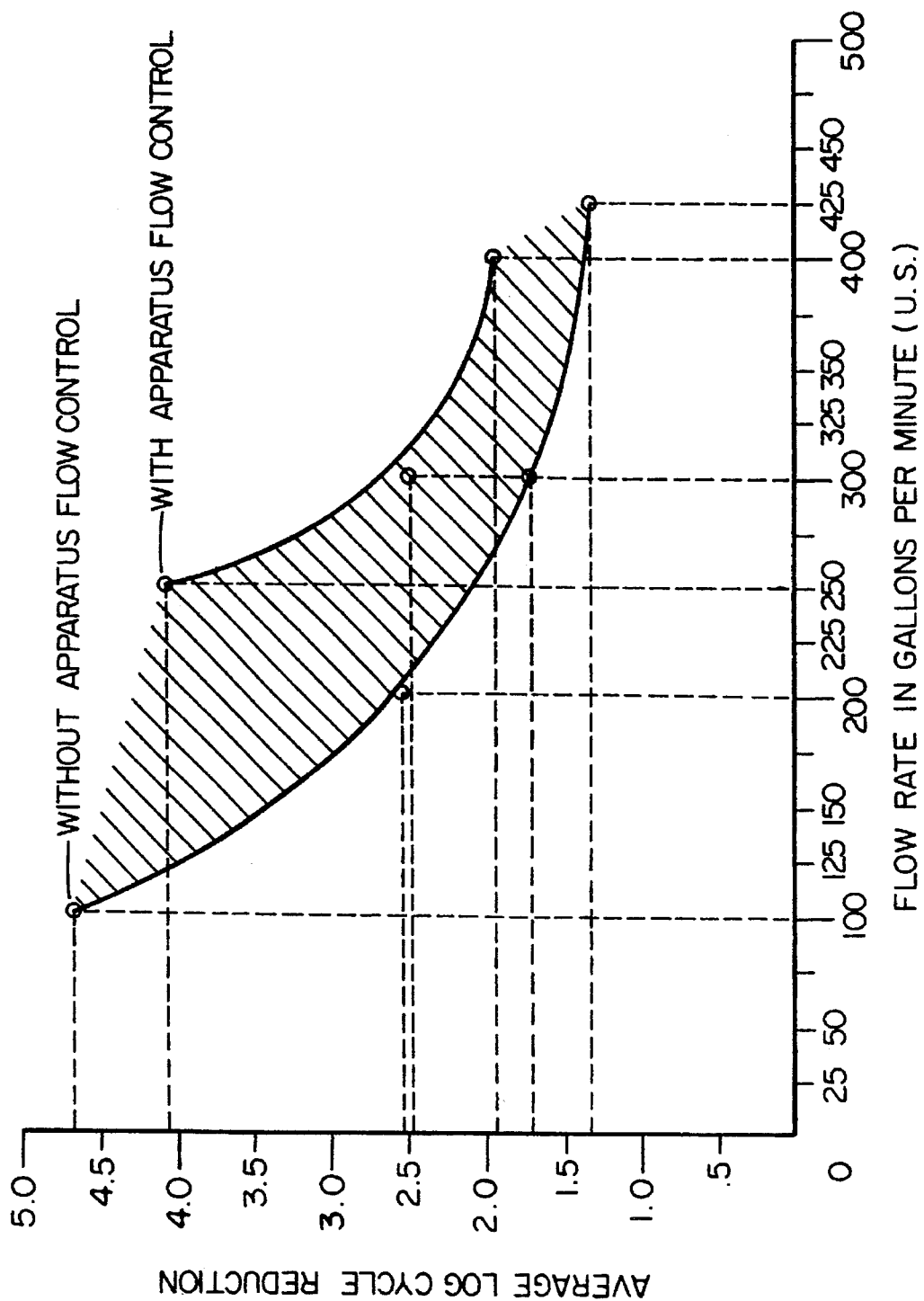
FIG. 7 is a graph showing the effectiveness of the apparatus of the present invention in reducing bacterial infection as compared to prior art methods over a range of flow rates.

FIG. 7 is a plot of flow rate of liquid against the average log cycle reduction in fecal bacteria based on the results shown in the above tables. The results demonstrate the superior lethality of the apparatus and method of the present invention at higher flow rates. For example, at 250 US gallons per minute, with the sewage effluent ultra-violet transmission at approximately 50%, the parallel sided system gave a 2 log cycle reduction of bacteria (reduction by a factor of 100) while the apparatus of the present invention gave a 4 log cycle reduction (reduction by a factor of 10,000).

Although the present invention has been described in some detail by way of example for purposes of clarity and understanding, it will be apparent that certain changes and modifications may be practised within the scope of the appended claims.

I claim:

1. Apparatus for exposing a liquid to be treated to bactericidal radiation comprising:

an elongate, generally cylindrical source of ultra-violet radiation having a longitudinal axis;

non-opaque, elongate housing means enclosing the source of ultra-violet radiation to prevent direct exposure of the source to a plug flow of liquid and permit exposure of the liquid to the radiation;

channelling means positioned to define uniform width channels conforming to the shape of the housing means to confine and direct liquid flow about the housing means perpendicular to the longitudinal axis of the source of ultra-violet radiation; and means for inducing turbulent flow in the channels such that when the apparatus is inserted into a flow of the liquid to be treated, the means for inducing turbulent flow acting to establish a flow in the channels that continually cycles from directly adjacent the housing means to the channelling means and back again during passage through the channels to ensure balanced exposure of the liquid to a lethal dose of the ultra-violet radiation of the source.

2. Apparatus as claimed in claim 1 in which the source of ultra-violet radiation is a lamp.

3. Apparatus as claimed in claim 2 in which the ultra-violet source is a medium or high intensity source producing light that includes wavelengths of 254 nm.

4. Apparatus as claimed in claim 2 in which the non-opaque housing means comprises a transparent, quartz sheath.

5. Apparatus as claimed in claim 4 in which the channelling means comprise a pair of spaced elongate members positioned adjacent and parallel the housing means on opposite sides thereof, each elongate member having a concave inner wall to define a uniform width, annular channel between the housing means and the wall for liquid flow on either side of the housing means.

6. Apparatus as claimed in claim 1 in which the means for inducing turbulent flow comprises a plurality of projections that extend from the channelling means into the channels.

7. Apparatus as claimed in claim 1 arranged in an array of interconnected units to define a plurality of parallel channels insertable into a passage for liquid flow to extend across the passage.

8. Apparatus as claimed in claim 1 arranged in an array of interconnected units to define a plurality of channels arranged in series to receive liquid flow.

9. Apparatus as claimed in claim 1 arranged in an array of interconnected units to define multiple rows of parallel channels insertable into a passage for liquid flow to extend across the passage.

10. Method for exposing a liquid to be treated to bactericidal radiation comprising the steps of:

providing an elongated, generally cylindrical source of ultra-violet radiation having a longitudinal axis;

providing a channelling means positioned to define uniform width channels conforming to the shape of the source;

providing a means for inducing turbulent flow in the channels;

moving a plug flow of liquid to be treated past the source of ultra-violet radiation in a direction perpendicular to the longitudinal axis in said uniform channels;

wherein the means for inducing a turbulent flow of the liquid in the channels establishes a cyclical flow in the paths that continually cycles from directly adjacent the source to a position away from the source and back again to ensure balanced exposure of the liquid to the ultra-violet radiation of the source.

11. The method of claim 10 including providing a non-opaque housing about the radiation source to protect the source from exposure to liquid.

12. The method of claim 10 in which the turbulent flow is established by providing turbulence inducing projections in the channels.

13. The method of claim 12 in which a plurality of radiation sources are arranged in parallel rows across a liquid flow to accommodate simultaneous treatment of a large volume of liquid.

* * * * *